(12) United States Patent
Willard

(10) Patent No.: US 6,866,327 B2
(45) Date of Patent: Mar. 15, 2005

(54) TONNEAU PANEL MECHANISM

(75) Inventor: Michael Willard, Harrison Township, MI (US)

(73) Assignee: ASC Incorporated, Southgate, MI (US)

(*) Notice: Subject to any disclaimer, the term of this patent is extended or adjusted under 35 U.S.C. 154(b) by 0 days.

(21) Appl. No.: 10/359,949

(22) Filed: Feb. 6, 2003

(65) Prior Publication Data
US 2004/0178658 A1 Sep. 16, 2004

(51) Int. Cl.⁷ .................................................. B60J 7/20
(52) U.S. Cl. ........................... 296/136.06; 296/107.08; 296/76
(58) Field of Search ....................... 296/107.08, 136.01, 296/136.05, 136.06, 76

(56) References Cited

U.S. PATENT DOCUMENTS

| 2,181,869 A | 12/1939 | Carr |
| 2,234,040 A | 3/1941 | Carr |
| 2,303,789 A | 12/1942 | Carr |
| 2,747,928 A | 5/1956 | Olivier et al. |
| 2,845,299 A | 7/1958 | Pickering |
| 3,053,567 A | 9/1962 | Geiger |
| 3,338,624 A | 8/1967 | Champion |
| 3,377,099 A | 4/1968 | Podolan |
| 3,575,464 A | 4/1971 | Himka et al. |
| 4,634,171 A | 1/1987 | McKeag |
| 4,687,247 A | 8/1987 | Muscat |
| 4,828,317 A | 5/1989 | Muscat |
| 5,033,789 A | 7/1991 | Hayashi et al. |
| 5,090,764 A | 2/1992 | Kogawa et al. |
| 5,533,777 A | 7/1996 | Kleemann et al. |
| 5,542,735 A | 8/1996 | Furst et al. |
| 5,551,743 A | 9/1996 | Klein et al. |
| 5,558,389 A | 9/1996 | Rothe et al. |
| 5,593,202 A | 1/1997 | Corder et al. |

(List continued on next page.)

FOREIGN PATENT DOCUMENTS

| DE | 3733892 | 4/1989 |
| DE | 3743502 | 7/1989 |
| JP | 61-247515 | 11/1986 |
| JP | 1-111525 | 4/1989 |

Primary Examiner—Patricia L. Engle
(74) Attorney, Agent, or Firm—Harness, Dickey & Pierce, P.L.C.

(57) ABSTRACT

A tonneau panel mechanism engages a stationary track in a closed position and disengages from the stationary track when in the open position. The tonneau panel exhibits a first stage of motion that includes both pivotal and non-pivotal motion and a second stage of motion that consists of substantially rotational motion about a pivot. The tonneau panel mechanism can include a linkage assembly with at least one link that engages with a stop on the tonneau panel to alter the motion of the tonneau panel between the first and second stages of motion. The tonneau panel can also use an at least four-bar linkage wherein at least two of the links move relative to one another during the first stage of motion and are locked together during a second stage of motion.

41 Claims, 15 Drawing Sheets

U.S. PATENT DOCUMENTS

| | | |
|---|---|---|
| 5,743,587 A | 4/1998 | Alexander et al. |
| 5,746,470 A | 5/1998 | Seel et al. |
| 5,758,923 A | 6/1998 | Kolb |
| 5,810,422 A | 9/1998 | Corder et al. |
| 5,823,606 A | 10/1998 | Schenk et al. |
| 5,921,608 A | 7/1999 | Schmitt et al. |
| 5,944,378 A | 8/1999 | Mather et al. |
| 5,967,593 A | 10/1999 | Schuler et al. |
| 6,010,178 A | 1/2000 | Hahn et al. |
| 6,019,417 A | 2/2000 | Haberl |
| 6,039,382 A | 3/2000 | Mather et al. |
| 6,048,021 A | 4/2000 | Sautter, Jr. |
| 6,053,559 A | 4/2000 | Heberl et al. |
| 6,053,560 A | 4/2000 | Rothe |
| 6,062,628 A | 5/2000 | Guillez |
| 6,164,713 A | 12/2000 | Graf et al. |
| 6,168,224 B1 | 1/2001 | Henn et al. |
| 6,186,577 B1 | 2/2001 | Guckel et al. |
| 6,193,300 B1 | 2/2001 | Nakatomi et al. |
| 6,217,104 B1 | 4/2001 | Neubrand |
| 6,250,707 B1 | 6/2001 | Dintner et al. |
| 6,254,165 B1 | 7/2001 | Neubrand |
| 6,270,144 B1 | 8/2001 | Schenk |
| 6,288,511 B2 | 9/2001 | Porter et al. |
| 6,293,605 B2 | 9/2001 | Neubrand |
| 6,299,234 B1 | 10/2001 | Seel et al. |
| 6,315,349 B1 | 11/2001 | Kinnanen |
| 6,318,792 B1 | 11/2001 | Neubrand et al. |
| 6,325,445 B1 | 12/2001 | Schenk |
| 6,352,298 B1 | 3/2002 | Hayashi et al. |
| 6,357,815 B1 | 3/2002 | Queveau et al. |
| 6,390,532 B1 | 5/2002 | Mac Farland |
| 6,419,294 B2 | 7/2002 | Neubrand |
| 6,419,308 B1 | 7/2002 | Corder et al. |
| 6,425,621 B2 | 7/2002 | Miklosi et al. |
| 6,425,622 B2 | 7/2002 | Eberle |
| 6,695,386 B1 | 2/2004 | Willard |
| 6,705,662 B2 * | 3/2004 | Sande .................. 296/107.08 |
| 2001/0004156 A1 | 6/2001 | Neubrand et al. |
| 2001/0005086 A1 | 6/2001 | Neubrand |
| 2001/0005089 A1 | 6/2001 | Neubrand |
| 2001/0019213 A1 | 9/2001 | Eberle |
| 2001/0020793 A1 | 9/2001 | Eberle |
| 2001/0040386 A1 | 11/2001 | Miklosi et al. |
| 2001/0048231 A1 | 12/2001 | Ellermann et al. |
| 2002/0011739 A1 | 1/2002 | Nicastri |
| 2002/0014782 A1 | 2/2002 | Neubrand |
| 2002/0024231 A1 | 2/2002 | Schutt |
| 2002/0036413 A1 | 3/2002 | Neubrand et al. |
| 2002/0041109 A1 | 4/2002 | Wagner et al. |
| 2002/0093218 A1 | 7/2002 | Weissmueller et al. |
| 2002/0105205 A1 | 8/2002 | Willard |

\* cited by examiner

TONNEAU PANEL MECHANISM

BACKGROUND AND SUMMARY OF THE INVENTION

The present invention is generally related to a convertible roof vehicle, and more particularly to a tonneau panel mechanism for use on a convertible roof vehicle.

Automotive vehicles having a convertible roof typically stow the convertible roof (when retracted) in a stowage compartment that is behind or aft of the passenger seating area. To provide a desired appearance, the retracted convertible roof can be covered by a tonneau panel. The tonneau panel can be designed to cover the entirety of the stowed convertible roof or a portion thereof. The tonneau panel can also be used to cover the stowage compartment when the convertible roof is in the raised or extended position. To accommodate the movement of the convertible roof from the stowed to the raised position and vice versa, the tonneau panel is operated between open and closed positions to allow access to the stowage compartment.

The tonneau panel is part of a tonneau panel mechanism that is operable to move the tonneau panel between the open and closed positions. Typical tonneau panel mechanisms employ a linkage assembly that controls the movement of the tonneau panel between the open and closed positions. The linkage assembly is required to provide positive control of the positioning of the tonneau panel as the tonneau panel moves between the open and closed positions. The linkage assembly also must move the tonneau panel to an open position that provides for adequate access to the stowage compartment to allow movement of the convertible roof from the stowed to the raised position and vice versa. Furthermore, upon moving the tonneau panel to the closed position, the linkage assembly must accurately position the tonneau panel so that a positive engagement of the tonneau panel with the automotive vehicle can be achieved to secure the tonneau panel in the closed position. Typical linkage assemblies employed in a tonneau panel mechanism to achieve these requirements have heretofore been complex. The complexity of the linkage assemblies can increase the cost and the time required to install the tonneau panel mechanism in an automotive vehicle.

In accordance with the present invention, a tonneau panel mechanism includes a tonneau panel that engages a stationary track when in a closed position and disengages from the stationary track when in the open position, and a linkage assembly that is operable to move the tonneau panel between the open and closed positions. In another aspect of the present invention, a tonneau panel mechanism includes a tonneau panel having a front portion that defines a substantially horizontal plane when the tonneau panel is in the closed position and the tonneau panel does not substantially raise above the horizontal plane during initial movement of the tonneau panel from the closed position to the open position. In yet another aspect of the present invention, a tonneau panel mechanism includes linkage assemblies on opposite sides of the tonneau panel that each include a single link that rotates about a single pivot and the tonneau panel rotates about these single pivots through at least a portion of movement between open and closed positions. In a different aspect of the present invention, the tonneau panel mechanism includes a link having an abutting member that engages with a stop on a tonneau panel in at least one position of the tonneau panel between open and closed positions and the stop and abutting member both move during movement of the tonneau panel. In still another aspect of the present invention, the tonneau panel mechanism uses an at least four-bar linkage wherein at least two of the links move relative to one another and lock together during different portions of movement of the tonneau panel between open and closed positions. In another aspect of the present invention, the tonneau panel mechanism includes a linkage assembly having at least two links that lock together when the tonneau panel is in the open position providing stability for the tonneau panel. Additionally, a method of operating a convertible roof system in conjunction with a tonneau panel mechanism on an automotive vehicle is disclosed.

The present invention is advantageous over traditional tonneau panel mechanisms in that the linkage assembly is of a simple design. The simple design provides for a reduced cost for the tonneau panel mechanism and a less time consuming installation of the tonneau panel mechanism in an automotive vehicle. The movement of the tonneau panel between the open and closed positions provides for a large opening through which a convertible roof can be retracted and extended. The use of a track to guide the positioning of the tonneau panel when in the closed position provides for positive control and secures the tonneau panel to the vehicle when in the closed position. The tonneau panel mechanism of the present invention can be utilized in an automotive vehicle having a hardtop convertible roof or a soft-top convertible roof. Additional advantages and features of the present invention will become apparent from the following description and appended claims taken in conjunction with the accompanying drawings.

BRIEF DESCRIPTION OF THE DRAWINGS

The present invention will become more fully understood from the detailed description and the accompanying drawings, wherein.

Figure 10A:
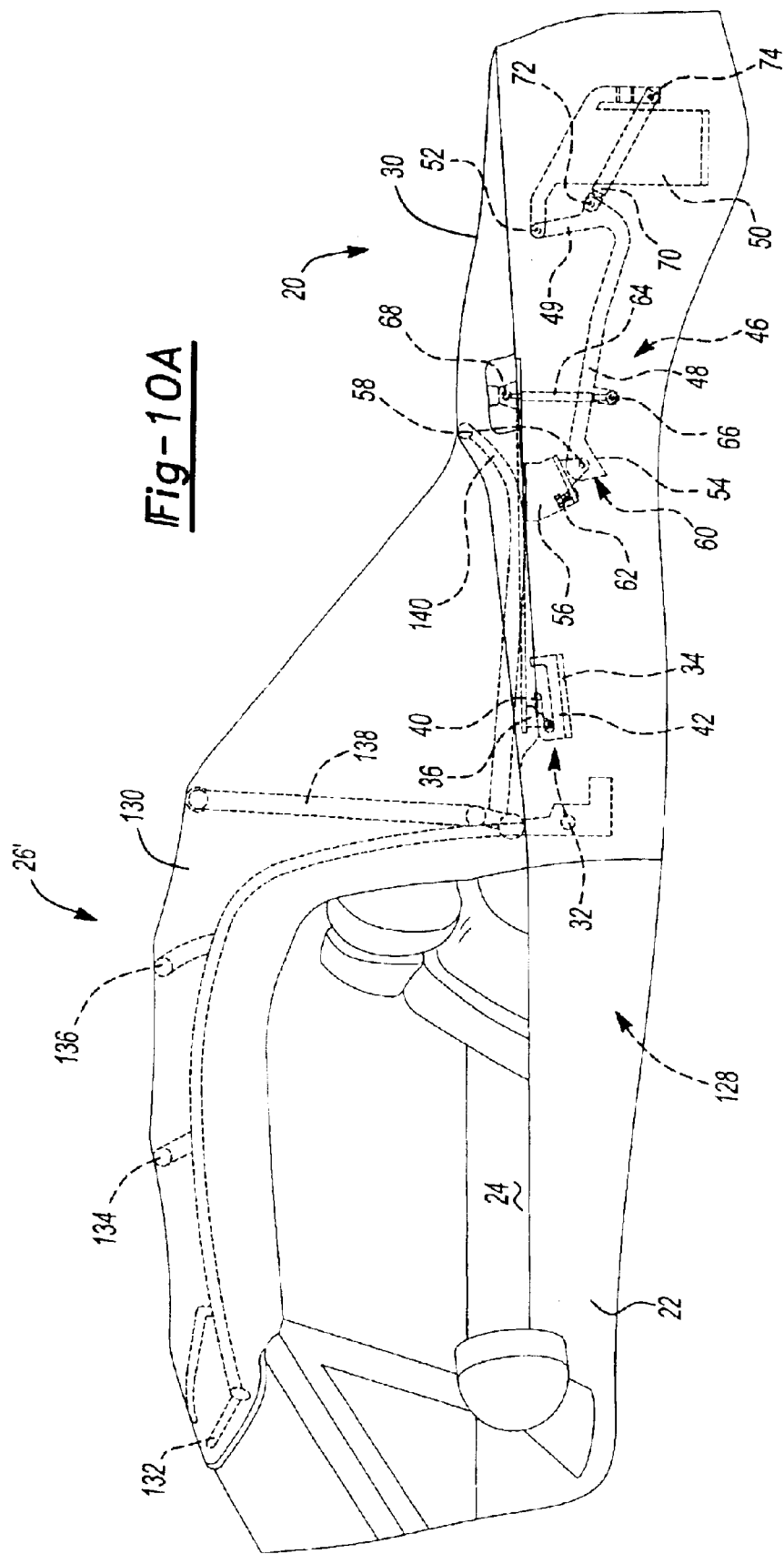
FIG. 10A is a fragmented elevation view of a soft-top convertible roof vehicle with the preferred embodiment of a
} tonneau panel mechanism according to the principles of the present invention in a closed position.
Figure 10B:
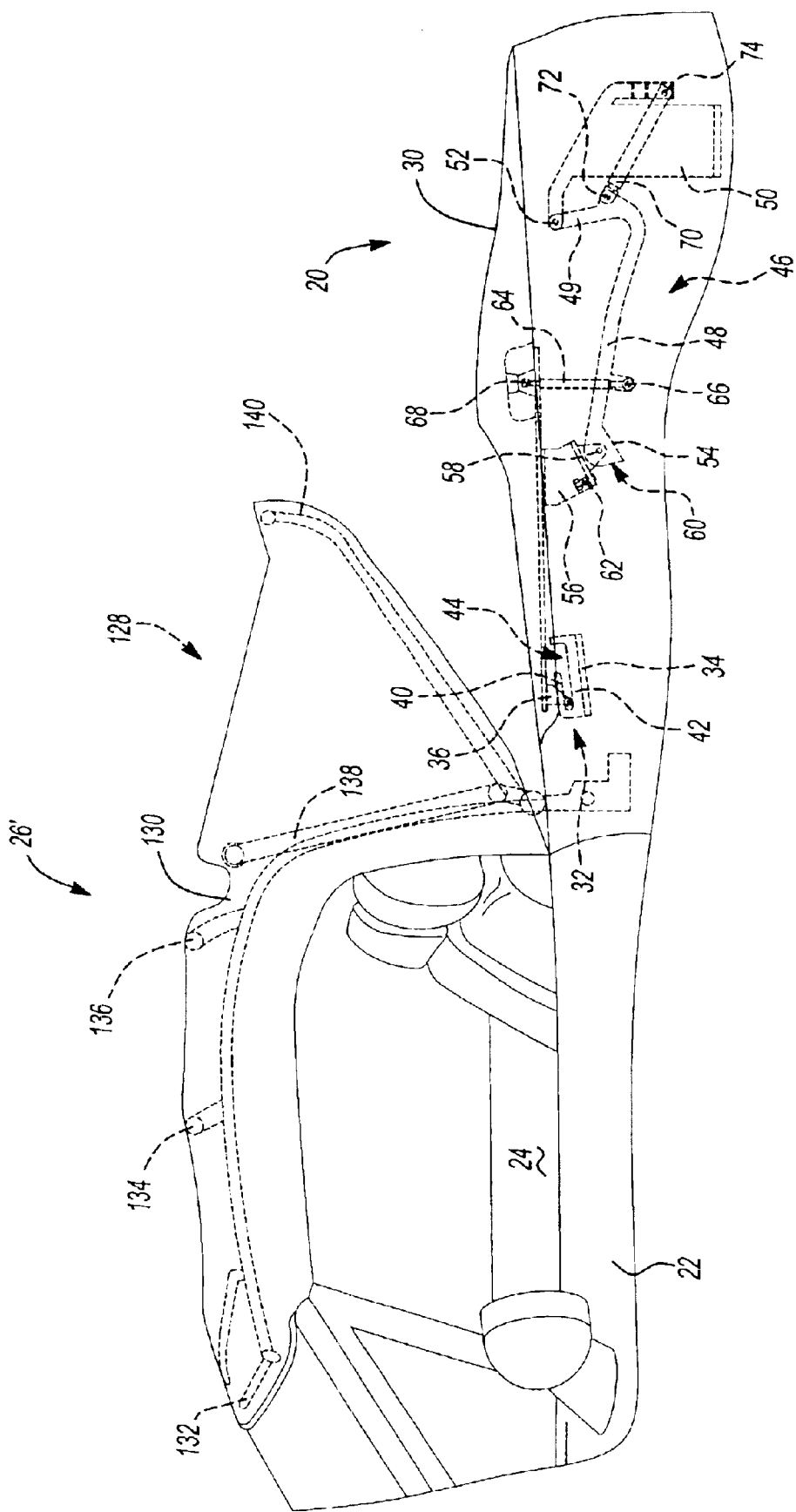
Figure 10C:
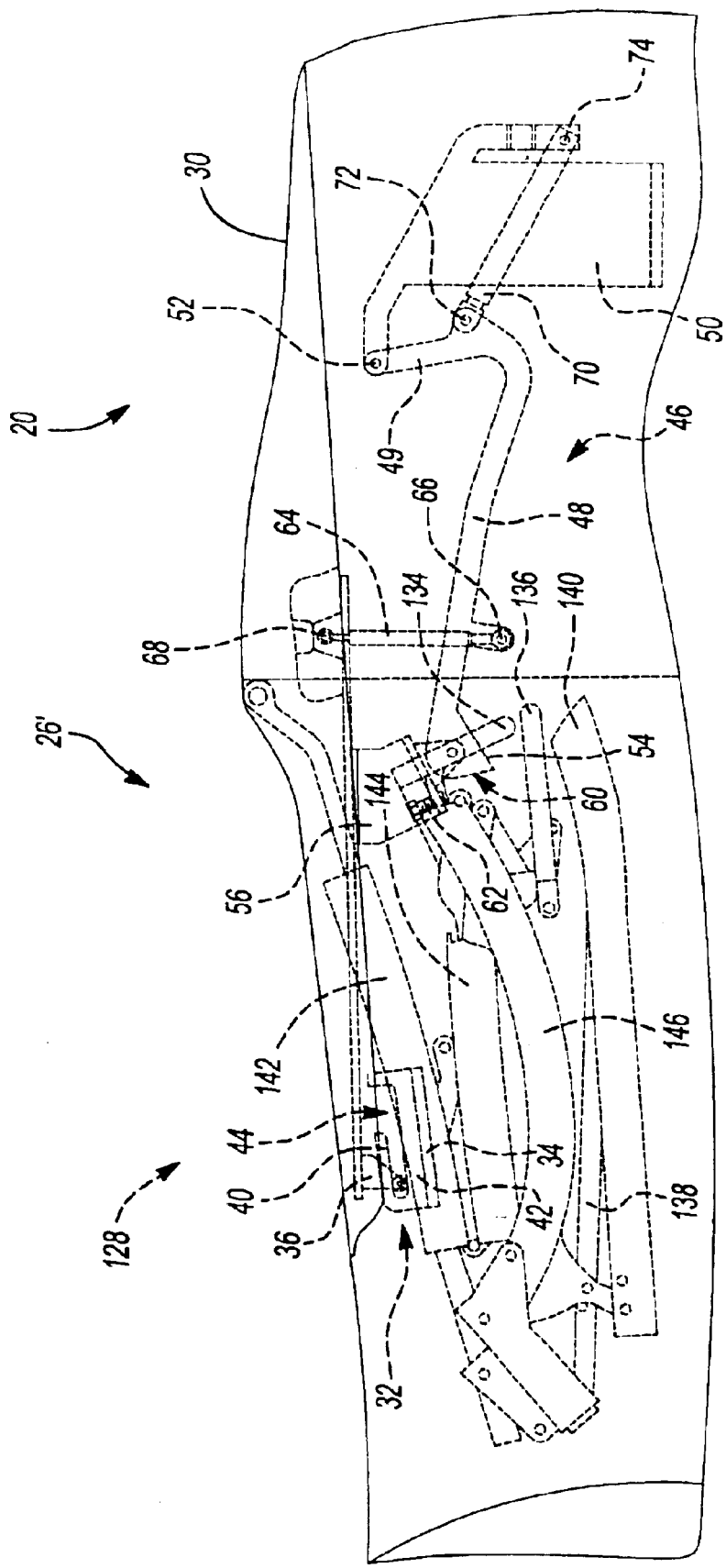
Figure 11A:
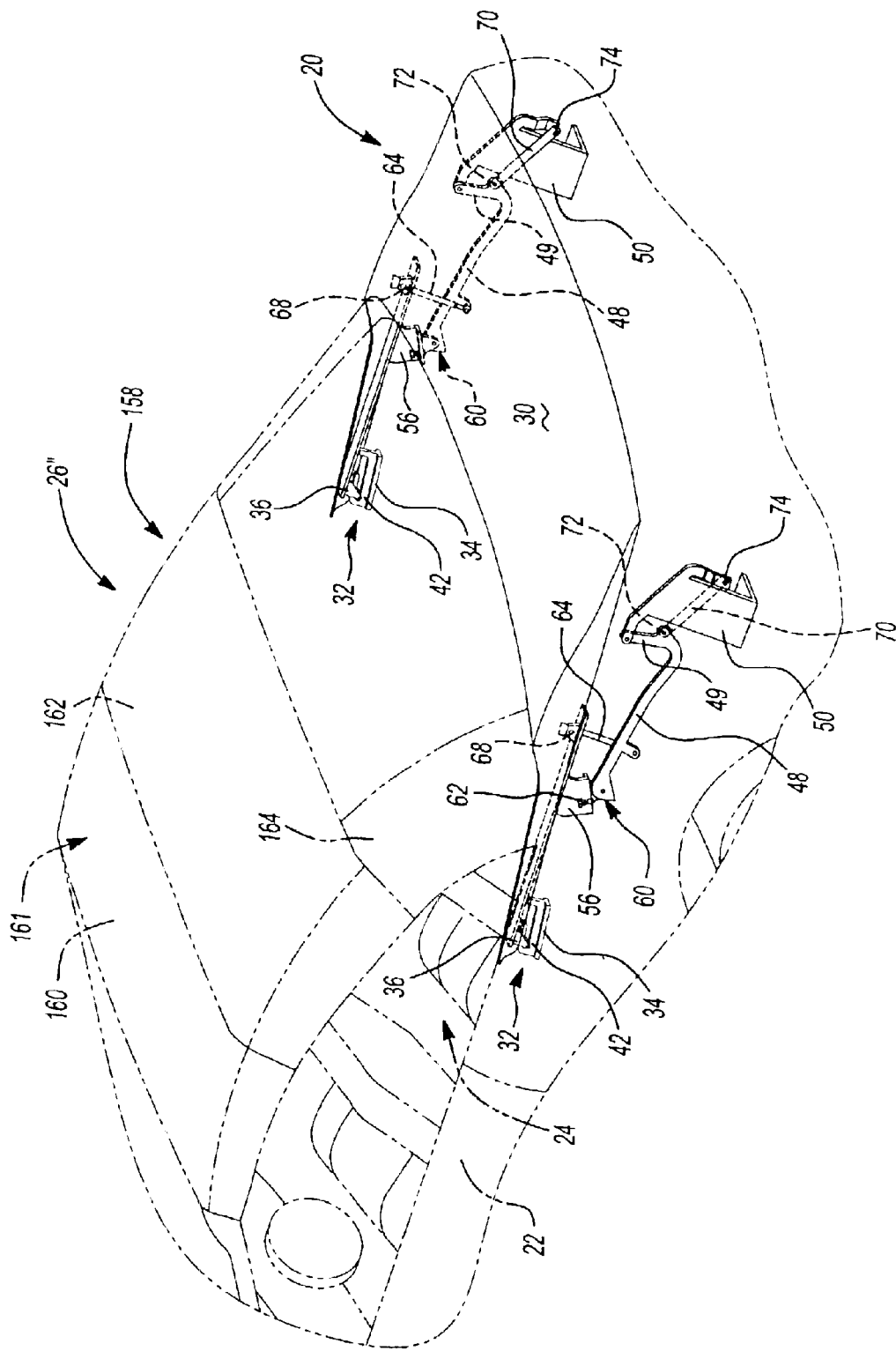
Figure 11B:
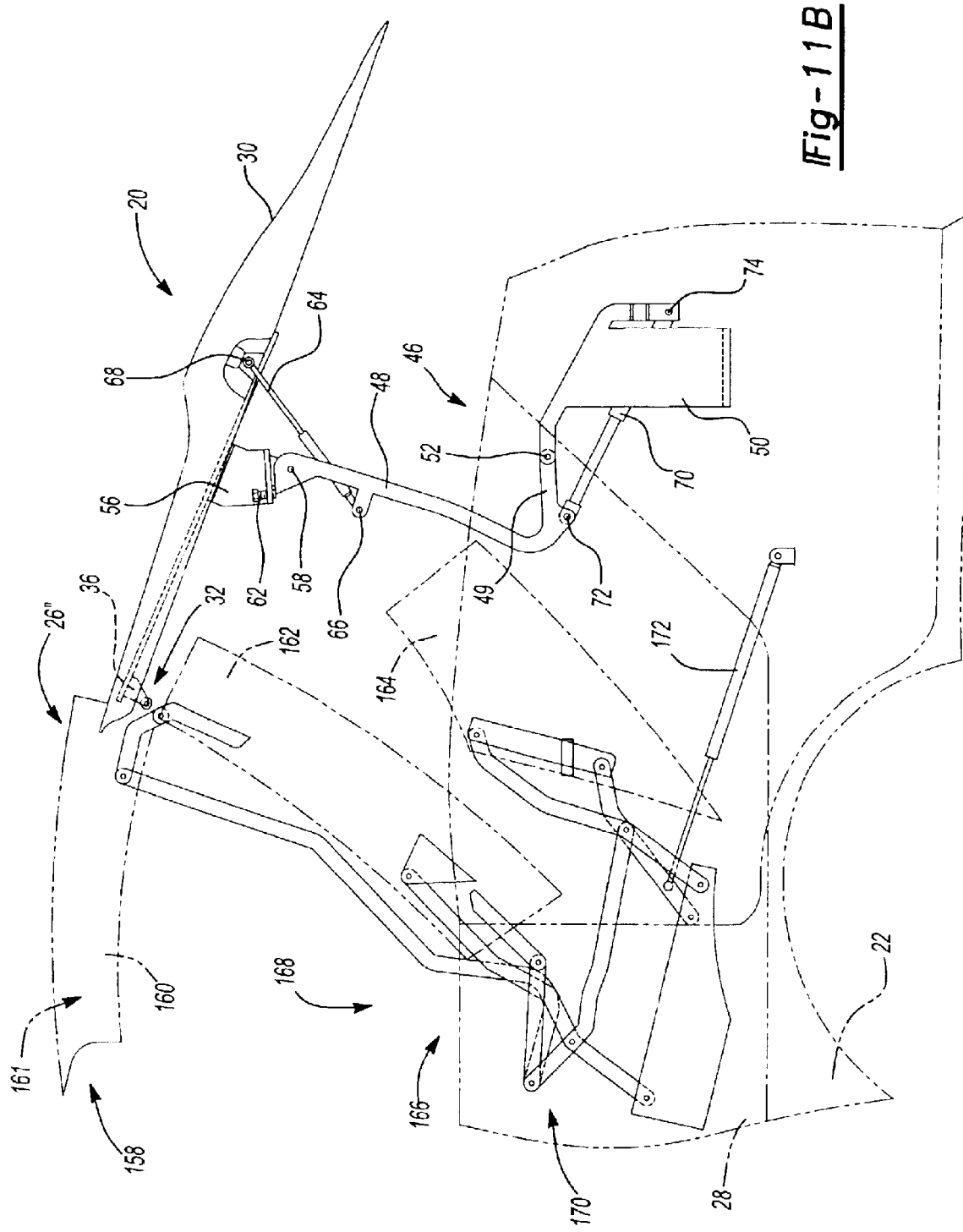
Figure 11C:
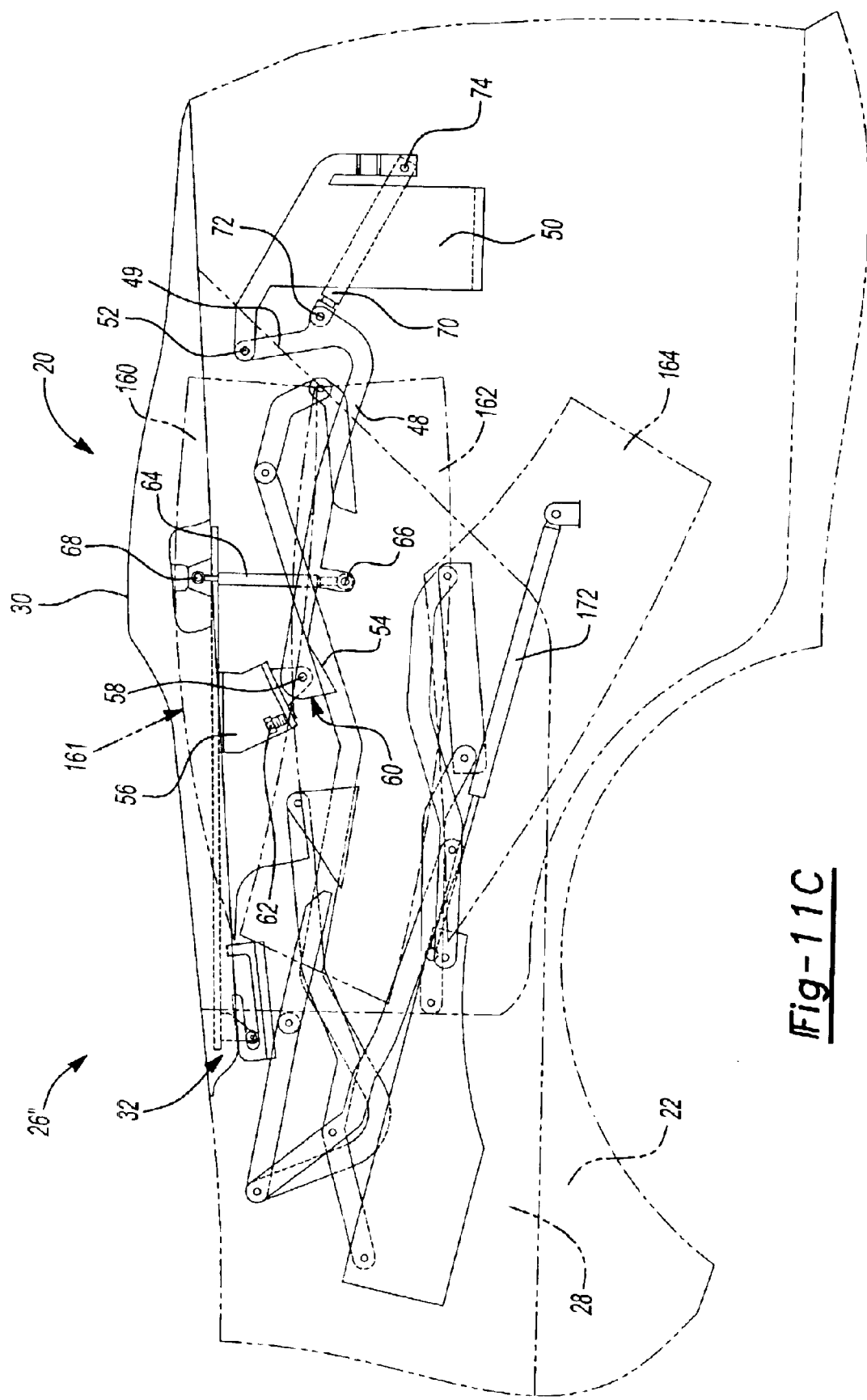

FIG. 10B is a fragmented elevation view of the vehicle of FIG. 10A with the rearmost roof bow of the soft-top convertible roof in an upright position and the tonneau panel in a closed position;

FIG. 10C is a fragmented elevation view of the vehicle of FIG. 10A with the soft-top convertible roof in a fully retracted position and the tonneau panel in a closed position;

FIG. 11A is a fragmented perspective view of a hardtop convertible roof vehicle with the preferred embodiment of a tonneau panel mechanism according to the principles of the present invention in a closed position;

FIG. 11B is a fragmented elevation view of the vehicle of FIG. 11A with the hardtop convertible roof in an intermediate position and the tonneau panel open to allow retraction and extension of the hardtop convertible roof; and FIG. 11C is a fragmented elevation view of the vehicle of FIG. 11A with the hardtop convertible roof in a fully retracted position and the tonneau panel in a closed position.

DETAILED DESCRIPTION OF THE PREFERRED EMBODIMENT

The following description of the preferred embodiment is merely exemplary in nature and is in no way intended to limit the invention, its application, or uses.

Referring to FIGS. 1–5, the preferred embodiment of a tonneau panel mechanism 20 according to the principles of the present invention is shown. Tonneau panel mechanism 20 is used in an automotive vehicle 22 having a passenger compartment 24, a convertible roof system 26, and a stowage compartment 28 for convertible roof system 26. Stowage compartment 28 is located behind passenger compartment 24 and retains convertible roof system 26 when the convertible roof is in the retracted position, as described below.

Tonneau panel mechanism 20 and convertible roof system 26 are substantially symmetrical about a longitudinal, fore-and-aft centerline (not shown) of vehicle 22. For brevity, only the driver's side of tonneau panel mechanism 20 and convertible roof system 26 are discussed, however, it should be understood that the passenger side tonneau panel mechanism and convertible roof system are substantially mirror images of the driver's side. Also, when using the terms "fore" and "aft" and "front" and "back" in describing components of tonneau panel mechanism 20 and convertible roof system 26, such reference refers to the orientation of the components when tonneau panel mechanism 20 is in the closed position and convertible roof system 26 is in the fully raised position.

Figure 1:
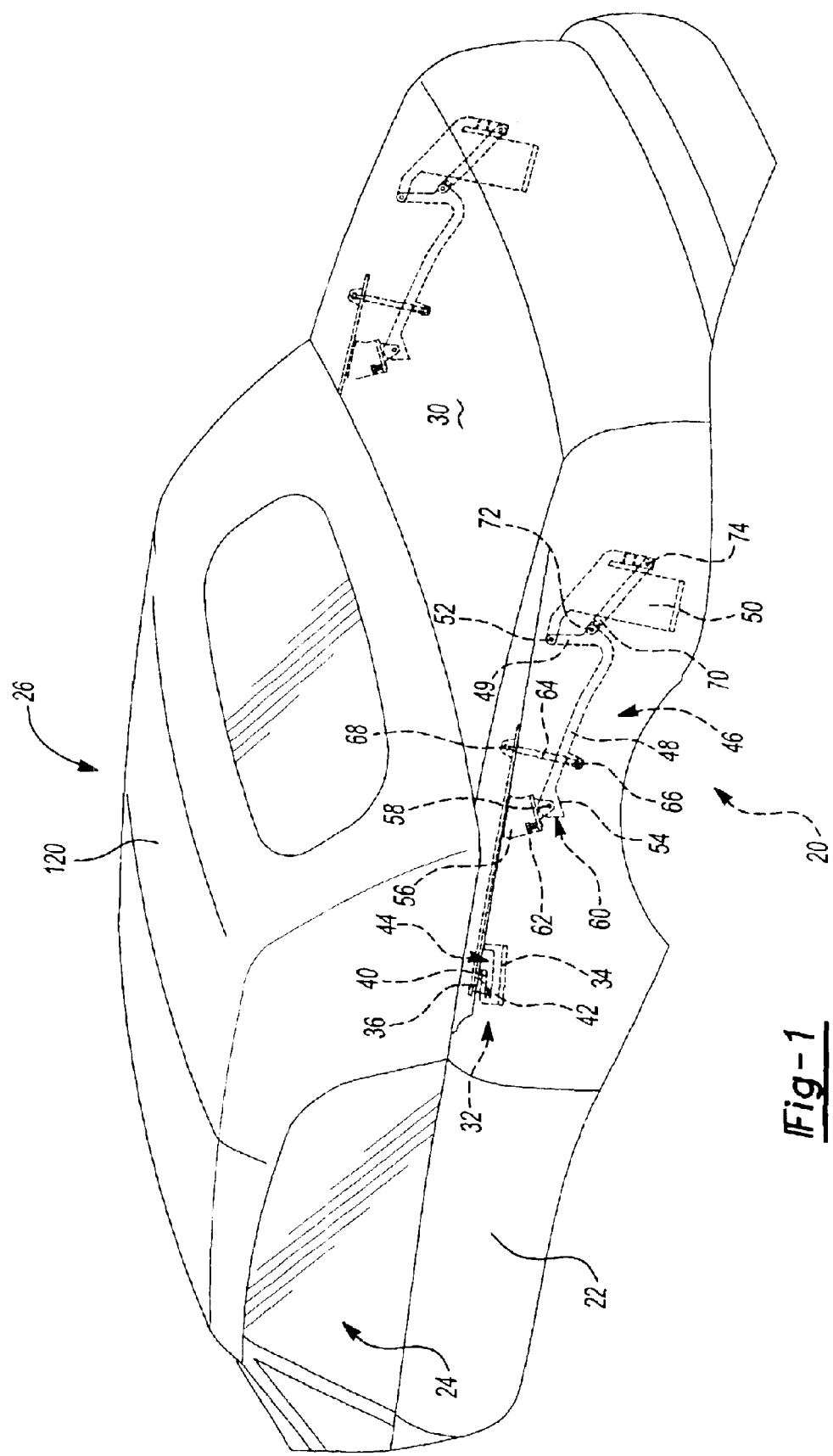
FIG. 1 is a fragmented perspective view of a convertible roof vehicle with a tonneau panel mechanism according to the principles of the present invention.
Figure 2:
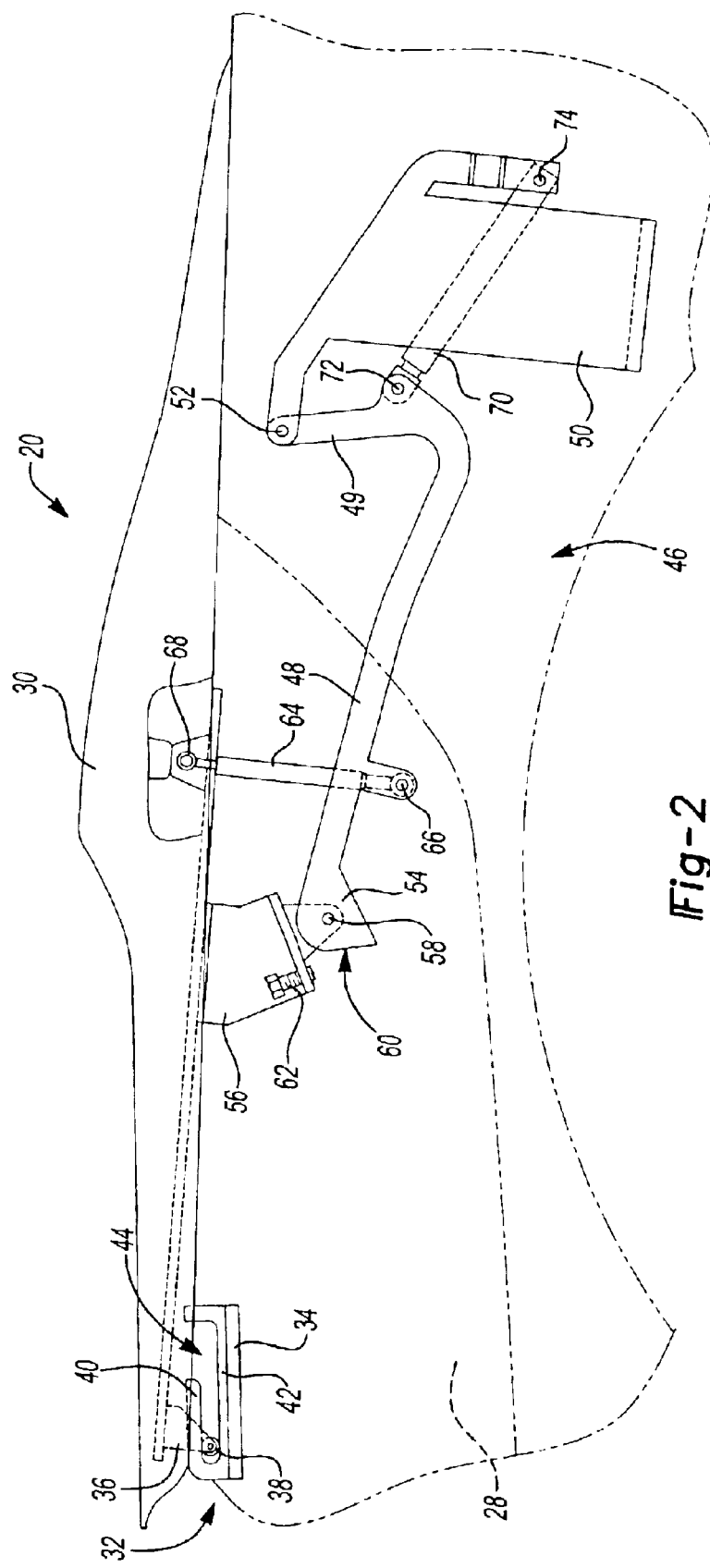
FIG. 2 is a fragmented elevation view of the vehicle of FIG. 1 with the tonneau panel mechanism in a closed position.
Figure 4:
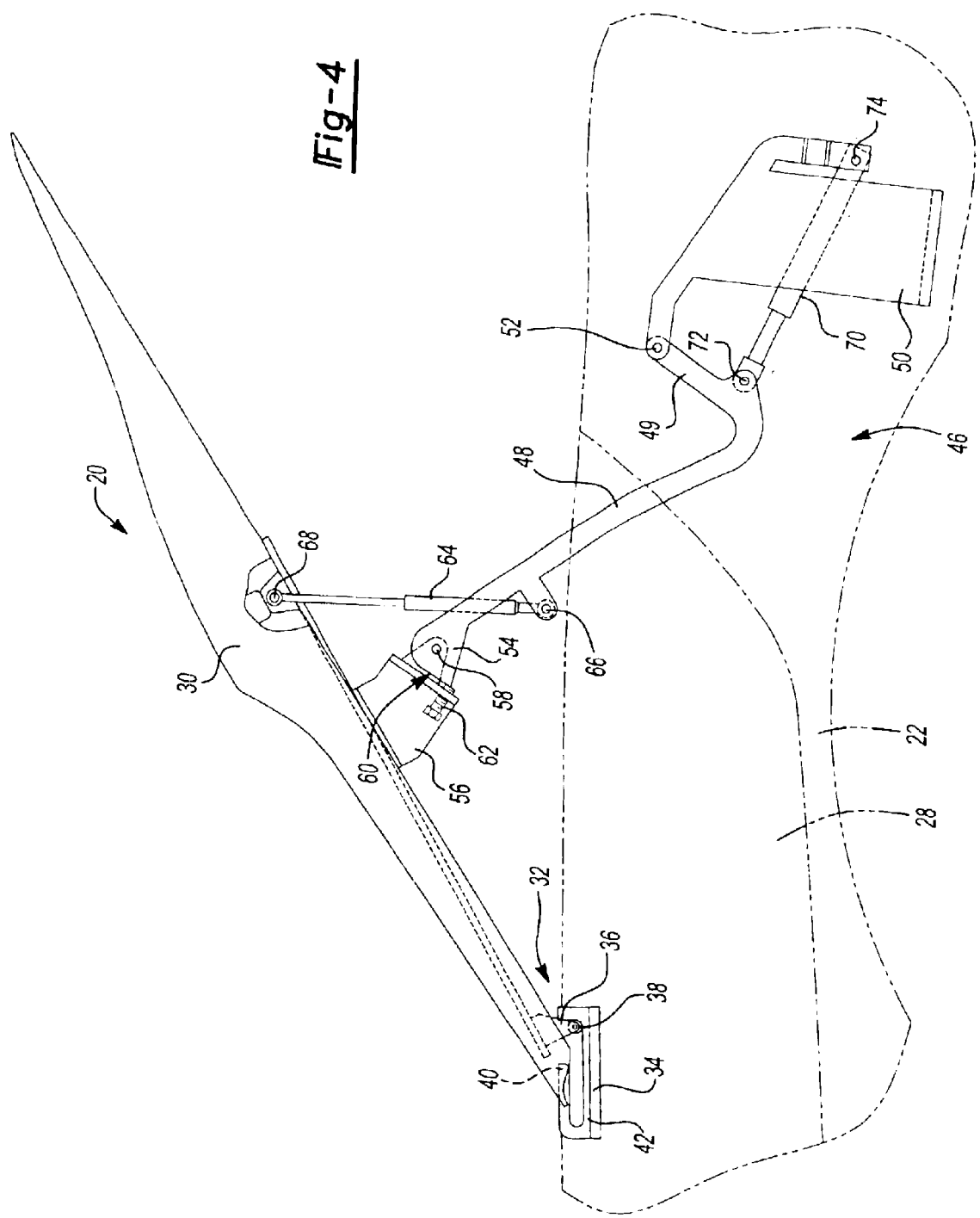
FIG. 4 is a fragmented elevation view of the vehicle of FIG. 1 with the tonneau panel in a different intermediate position.
Figure 5:
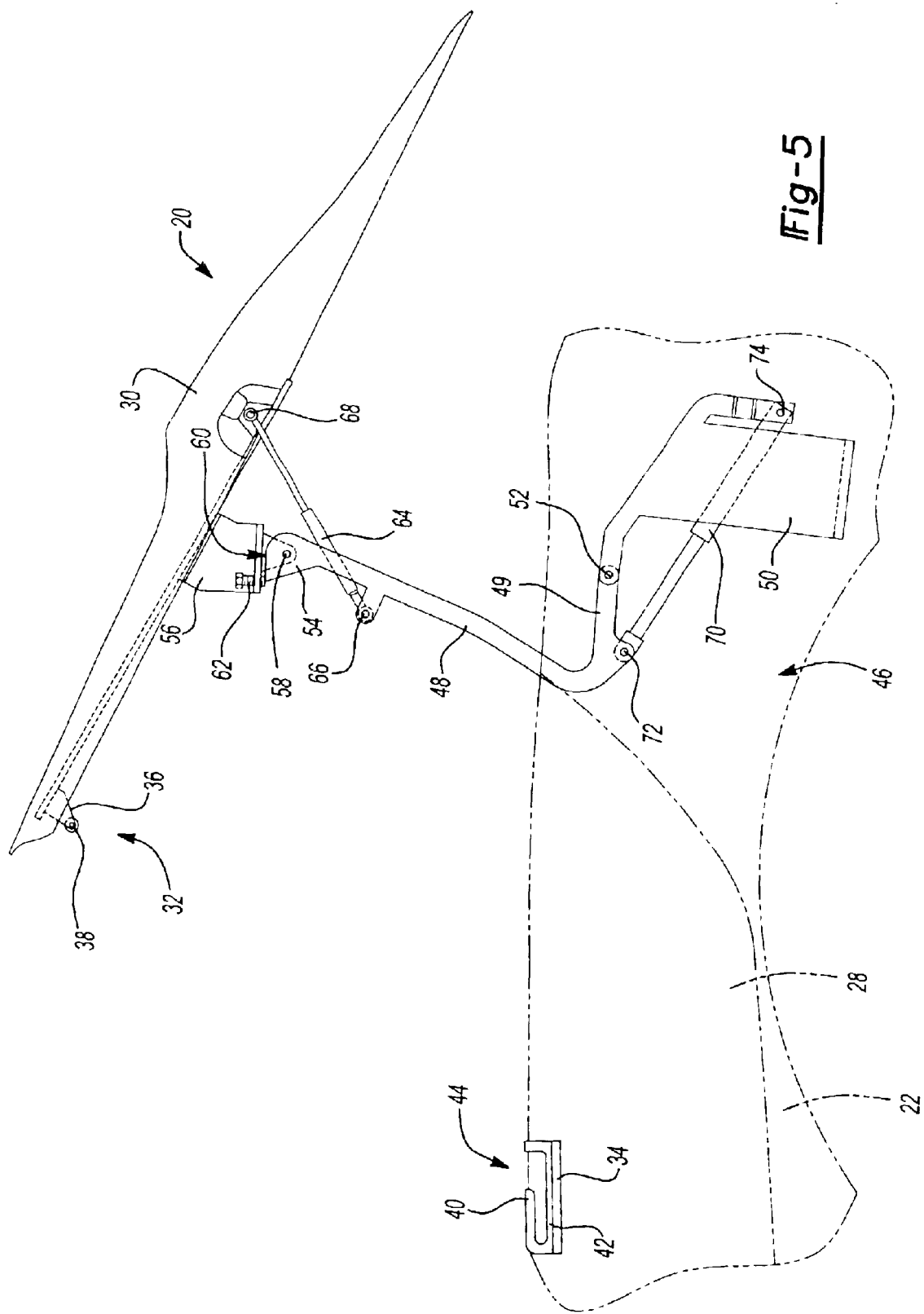
FIG. 5 is a fragmented elevation view of the vehicle of FIG. 1 with the tonneau panel in a fully open position to allow retraction and extension of the convertible roof.

Tonneau panel mechanism 20 includes a tonneau panel 30 that is operable between a closed position (as shown in FIGS. 1 and 2) through intermediate positions (such as those shown in FIGS. 3 and 4) and an open position (as shown in FIG. 5). Tonneau panel 30 is substantially horizontal and covers and/or conceals a majority of stowage compartment 28 when in the closed position. When tonneau panel 30 is in the open position, convertible roof system 26 can be moved between its extended and retracted positions, as discussed below. A front portion of tonneau panel 30 has a projection 32 that engages and disengages from a slide track 34 which is affixed to the body of vehicle 22. The front portion of tonneau panel 30 defines a substantially horizontal plane when tonneau panel 30 is in the closed position. Track 34 is stationary during movement of tonneau panel mechanism 20 between its closed and open positions. Projection 32 can take a variety of forms. For example, projection 32 can be in the form of a bracket 36 and roller 38 which are attached to a front portion of tonneau panel 30. Roller 38 facilitates movement of projection 32 along track 34 when tonneau panel 30 moves between its open and closed positions, as described below. Projection 32, alternatively, could also be in the form of a pin or other similar component that is capable of sliding along track 34 as tonneau panel 30 moves between the open and closed positions.

Track 34 has opposite upper and lower portions 40 and 42 which are joined together at the front of track 34 to form a channel that retains roller 38 and controls vertical movement of the front portion of tonneau panel 30 when roller 38 is positioned between upper and lower portions 40 and 42. There is an opening 44 in upper portion 40 that allows roller 38 to disengage from track 34 as tonneau panel 30 moves between the open and closed positions, as described below.

Tonneau panel mechanism 20 also includes a linkage assembly 46 that is operable to cause tonneau panel 30 to move between its open and closed positions, as described below. Linkage assembly 46 includes a link 48 which is in the form of a gooseneck link. A first end 49 of link 48 is pivotally attached to a bracket 50 at pivot 52. Bracket 50 is fixed to the body of vehicle 22. A second end 54 of link 48 is pivotally attached to bracket 56 at pivot 58. Bracket 56 is attached to an intermediate portion of tonneau panel 30. The second end 54 of link 48 has a substantially flat spot (abutting member) 60 that engages with a stop 62 on bracket 56 during a portion of the movement of tonneau panel 30 between open and closed positions, as described below. Engagement and disengagement of flat spot 60 with stop 62 alters the motion of tonneau panel 30, as described below. Stop 62 can take a variety of forms. For example, stop 62, as shown, can be in the form of a threaded bolt that is retained in a complementary threaded opening in bracket 56. Stop 62 can be adjusted by rotating the stop relative to bracket 56 which alters the length of the portion of stop 62 that extends beyond bracket 56 and engages with flat spot 60 of link 48.

One end of a balance strut 64 is pivotally connected to an intermediate portion of link 48 at pivot 66 while an opposite end of strut 64 is pivotally attached to an intermediate portion of tonneau panel 30 at pivot 68. Strut 64 helps to balance and stabilize tonneau panel 30 when in the open position, as described below. Strut 64 can take a variety of forms. For example, strut 64 can be a gas strut, as shown, or a spring loaded strut. A powered actuator 70, in this case in the form of a hydraulic cylinder, is operable to cause linkage assembly 46 to move tonneau panel 30 between its open and closed positions. One end of hydraulic cylinder 70 is attached to an intermediate portion of link 48 adjacent first end 49 at pivot 72 while an opposite end of hydraulic cylinder 70 is pivotally attached to bracket 50 at pivot 74.

Figure 3:
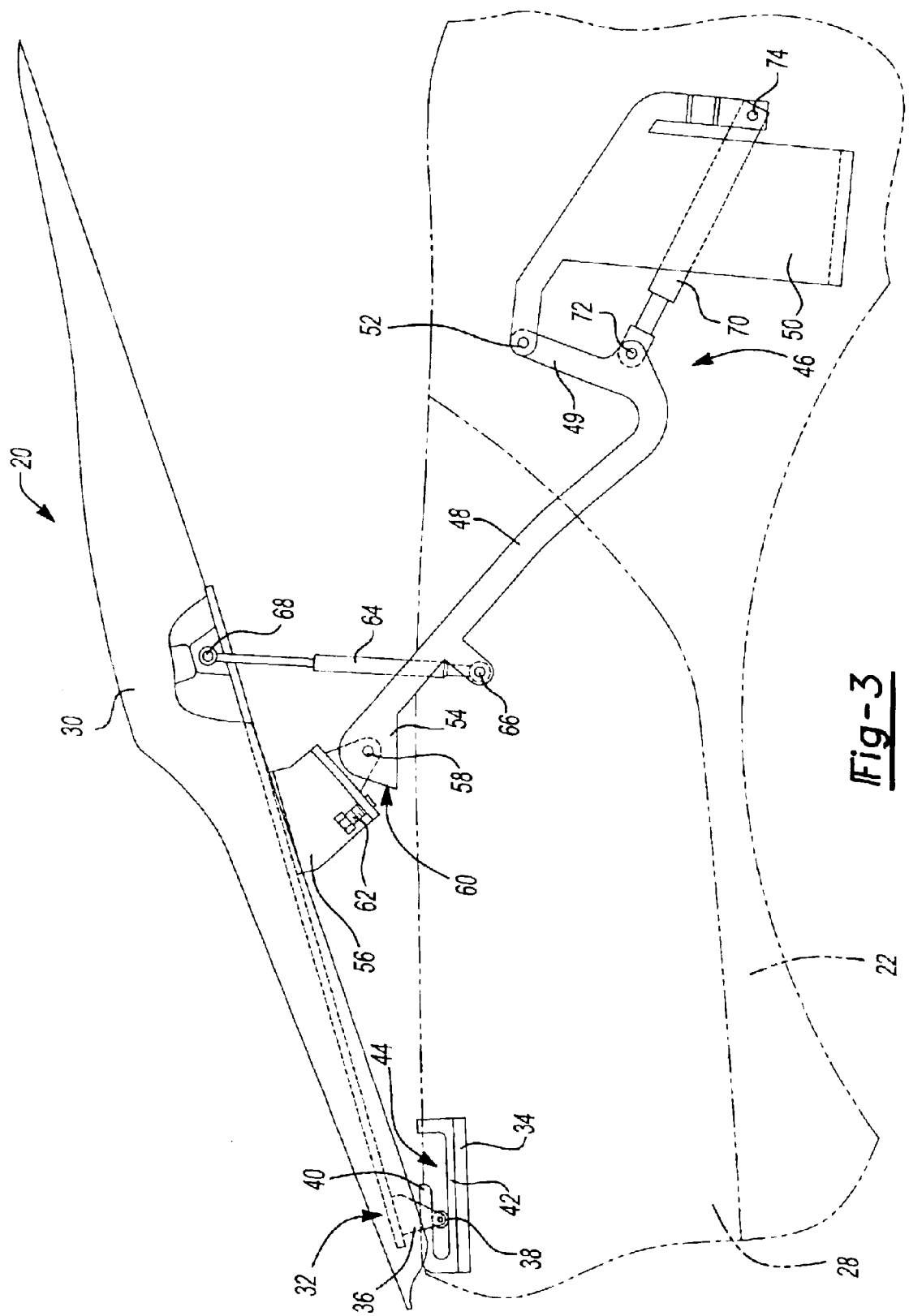
FIG. 3 is a fragmented elevation view of the vehicle of FIG. 1 with the tonneau panel mechanism in an intermediate position.

In use, linkage assembly 46 is operable to cause tonneau panel 30 to move from its closed position, as shown in FIG. 2, through intermediate positions, such as those shown in FIGS. 3 and 4, to its open position as shown in FIG. 5. When tonneau panel 30 is in its closed position, projection 32 is engaged with and secured in the channel formed by upper and lower portions 40 and 42 of track 34. The securing of projection 32 in track 34 controls the vertical movement of the front portion of tonneau panel 30. When moving tonneau panel 30 from its closed position to its open position, tonneau panel 30 exhibits two distinct stages of motion. During the first stage of motion tonneau panel 30 exhibits both pivotal and non-pivotal sliding movement while during the second stage of motion tonneau panel 30 exhibits rotational movement about a fixed pivot, as described below. The transition from the first stage of motion to the second stage of motion occurs when flat spot 60 on link 48 engages with stop 62, as described below.

To move tonneau panel 30 from its closed position to its open position, hydraulic cylinder 70 is supplied hydraulic fluid so that the length of hydraulic cylinder 70 increases. Increasing the length of hydraulic cylinder 70 causes link 48 to pivot clockwise about pivot 52. The pivotal movement of link 48 about pivot 52 causes tonneau panel 30 to pivot counterclockwise relative to link 48 about pivot 58. The pivoting of tonneau panel 30 causes the rear edge of tonneau panel 30 to move vertically upward away from the vehicle body while the front portion of tonneau panel 30 does not substantially raise above the horizontal plane and projection 32 moves rearwardly along track 34, as shown in FIG. 3. By keeping the front portion of tonneau panel 30 from raising substantially above the horizontal plane during the first stage of motion, the front portion of tonneau panel 30 can be positioned (when closed) under a rear portion of convertible roof system 26 and moved between the open and closed positions while convertible roof system 26 remains stationary in the raised position. Rotation of tonneau panel 30 counterclockwise about pivot 58 also causes strut 64 to elongate as the distance between pivots 66 and 68 increases. Continued elongation of hydraulic cylinder 70 eventually causes projection 32 to reach the rear portion of track 34 and flat spot 60 on link 48 to engage with stop 62 on tonneau panel 30. Preferably, stop 62 is adjusted so that it engages with flat spot 60 while projection 32 is adjacent opening 44 in track 34. This first stage of motion of tonneau panel 30 causes tonneau panel 30 to move to a forwardly inclined position, as shown in FIG. 4.

Once flat spot 60 on link 48 engages with stop 62 and projection 32 is adjacent opening 44 in track 34, motion of tonneau panel 30 switches from the first stage of motion to the second stage of motion. Continued elongation of hydraulic cylinder 70 continues to cause link 48 to rotate clockwise about pivot 52. Because flat spot 60 is engaged with stop 62 and projection 32 is adjacent opening 44 in track 34, tonneau panel 30 no longer rotates about pivot 58 with the continued elongation of hydraulic cylinder 70. Rather, tonneau panel 30 now remains stationary relative to link 48 during continued elongation of hydraulic cylinder 70. As hydraulic cylinder 70 is continued to be elongated, tonneau panel 30 rotates with link 40 clockwise about pivot 52 and continues until tonneau panel 30 is inclined rearwardly and reaches its open position as shown in FIG. 5. Once in its open position, convertible roof system 26 can be operated to cause the convertible roof to move between its extended and retracted positions, as described below. Thus, when moving tonneau panel 30 from its closed position to its open position, tonneau panel 30 exhibits two distinct stages of motion that cause tonneau panel 30 to move first to a forwardly inclined position and then to a rearwardly inclined position. To move tonneau panel 30 from its open position to its closed position, tonneau panel mechanism 20 is operated in a reverse fashion.

Referring now to FIGS. 6–9, an alternate embodiment of tonneau panel mechanism is shown and indicated as 20'. Tonneau panel mechanism 20' is substantially identical to tonneau panel mechanism 20, shown in FIGS. 1–5, and is differentiated by the specific linkage assembly 46 utilized. Specifically, tonneau panel mechanism 20' uses a linkage assembly 46' that includes a multi-bar linkage, as described below. Due to the similarity between tonneau panel mechanism 20 and 20', only the linkage assembly 46' will be described in detail.

Linkage assembly 46' includes a first link 90 that is generally L-shaped. A first end of first link 90 is pivotally attached to bracket 92, which is attached to the body of vehicle 22, at pivot 94. The other end of first link 90 has a slot 96 through which a pin 98 on tonneau panel 30 travels, as described below. First link 90 also has a pin 99 that engages with a channel on another link during a portion of movement of tonneau panel 30 between the closed and open positions, as described below. A second link 100 is pivotally attached to an intermediate portion of first link 90 adjacent slot 96 at pivot 102. Second link 100 is also pivotally connected to one end of a third link 104 at pivot 106. Second link 100 has an open-ended channel 108 that engages with pin 98 on tonneau panel 30 during movement of tonneau panel 30 between the closed and open positions, as described below. An opposite end of third link 104 is pivotally connected to a forward intermediate portion of tonneau panel 30 at pivot 110. One end of a fourth link 112 is pivotally connected to an intermediate portion of tonneau panel 30 at pivot 114 which is rearward of pivot 110. An opposite end of fourth link 112 is pivotally connected to bracket 92 at pivot 116. An intermediate portion of fourth link 112 has an open-ended channel 117 that engages with pin 99 on first link 90 during movement of tonneau panel 30 between the closed and open positions, as described below. Powered actuator 70, in this case in the form of a hydraulic cylinder, is pivotally connected to link 112 at pivot 118 which is adjacent pivot 116. Hydraulic cylinder 70 is also pivotally attached to vehicle 22 at pivot 120.

Figure 6:
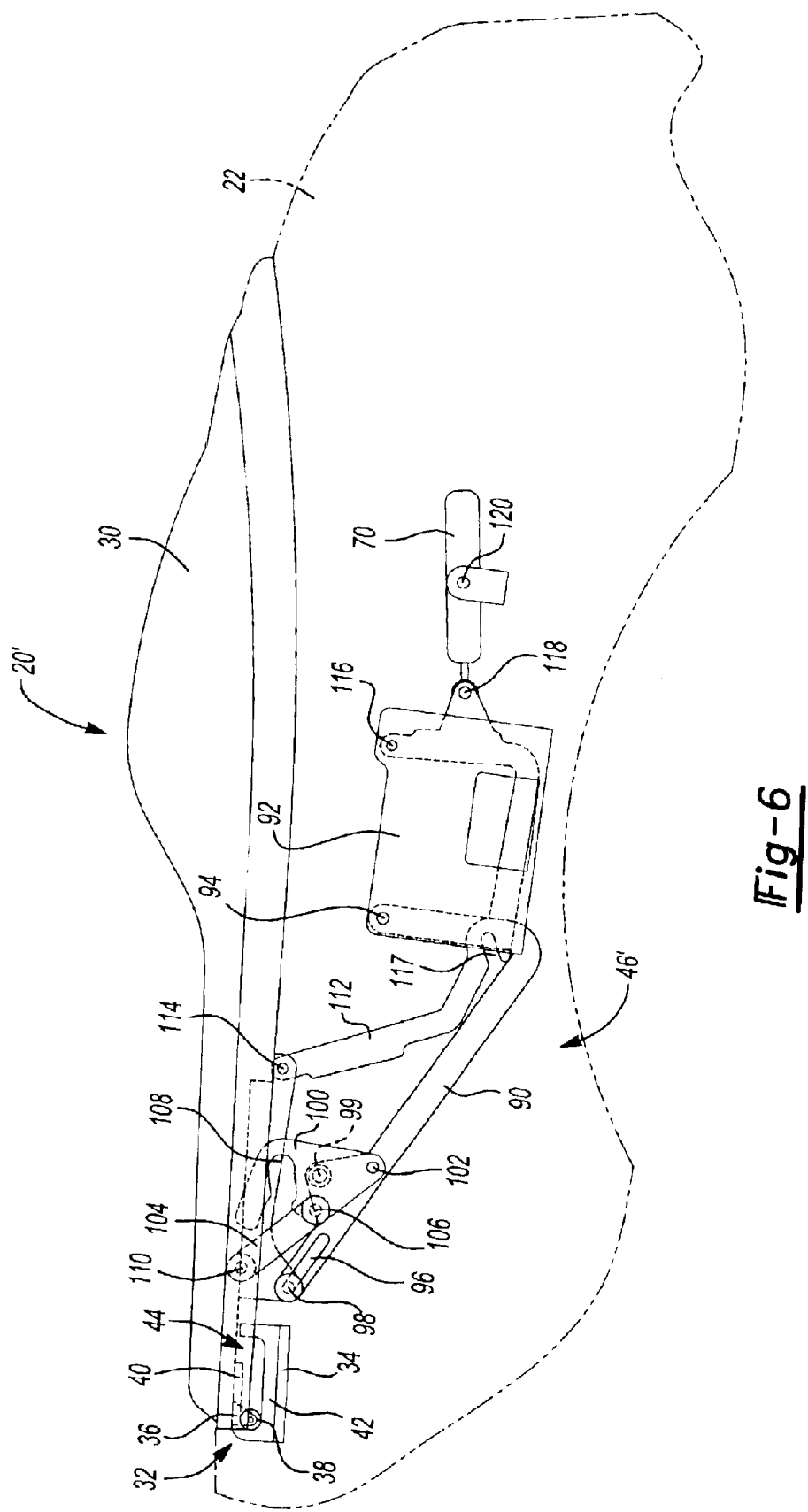
FIG. 6 is a fragmented elevation view of the convertible roof vehicle of FIG. 1 with an alternate embodiment of a tonneau panel mechanism according to the principles of the present invention in a closed position.
Figure 7:
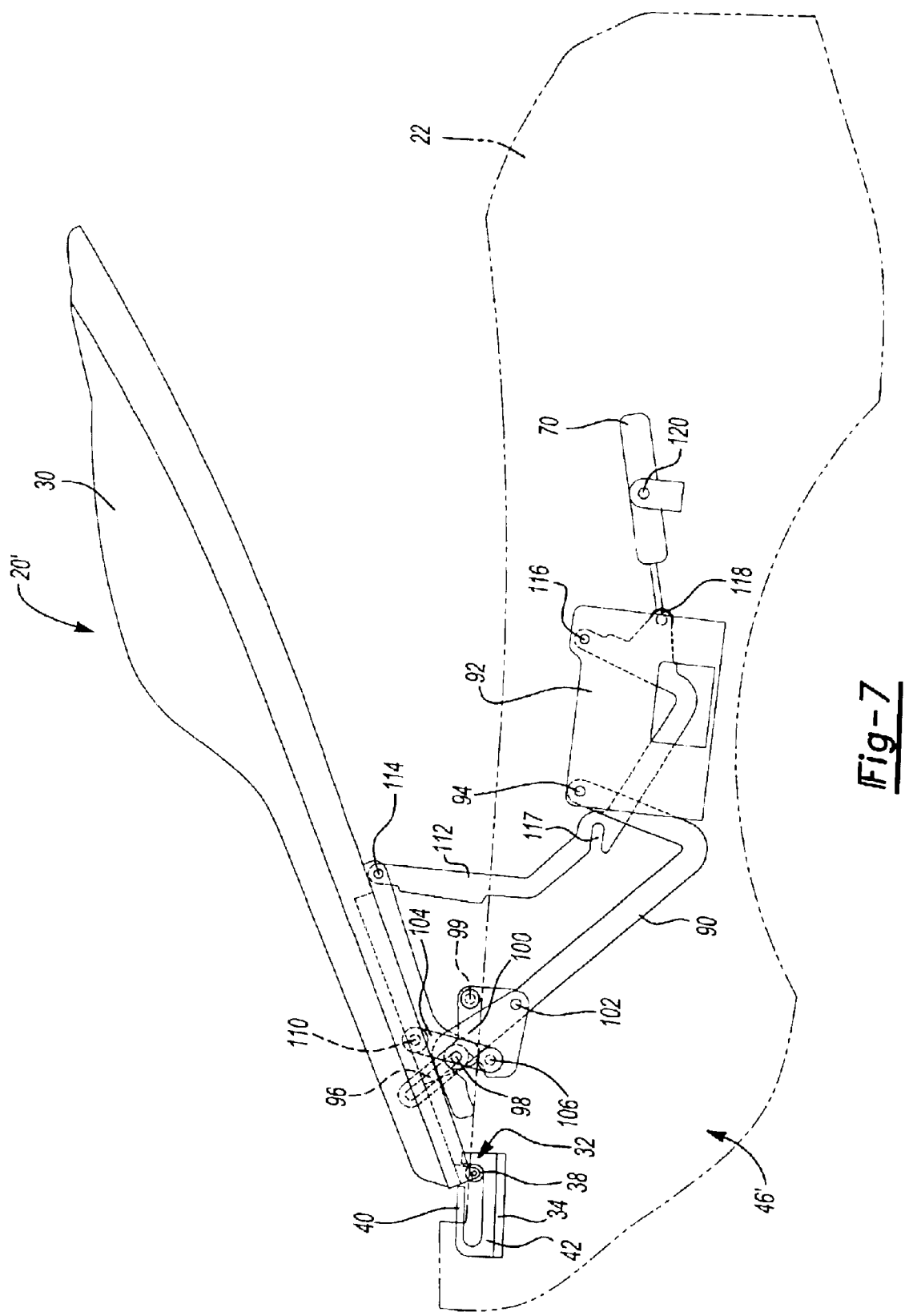
FIG. 7 is a fragmented elevation view of the vehicle of FIG. 6 with the tonneau panel in an intermediate position.
Figure 8:
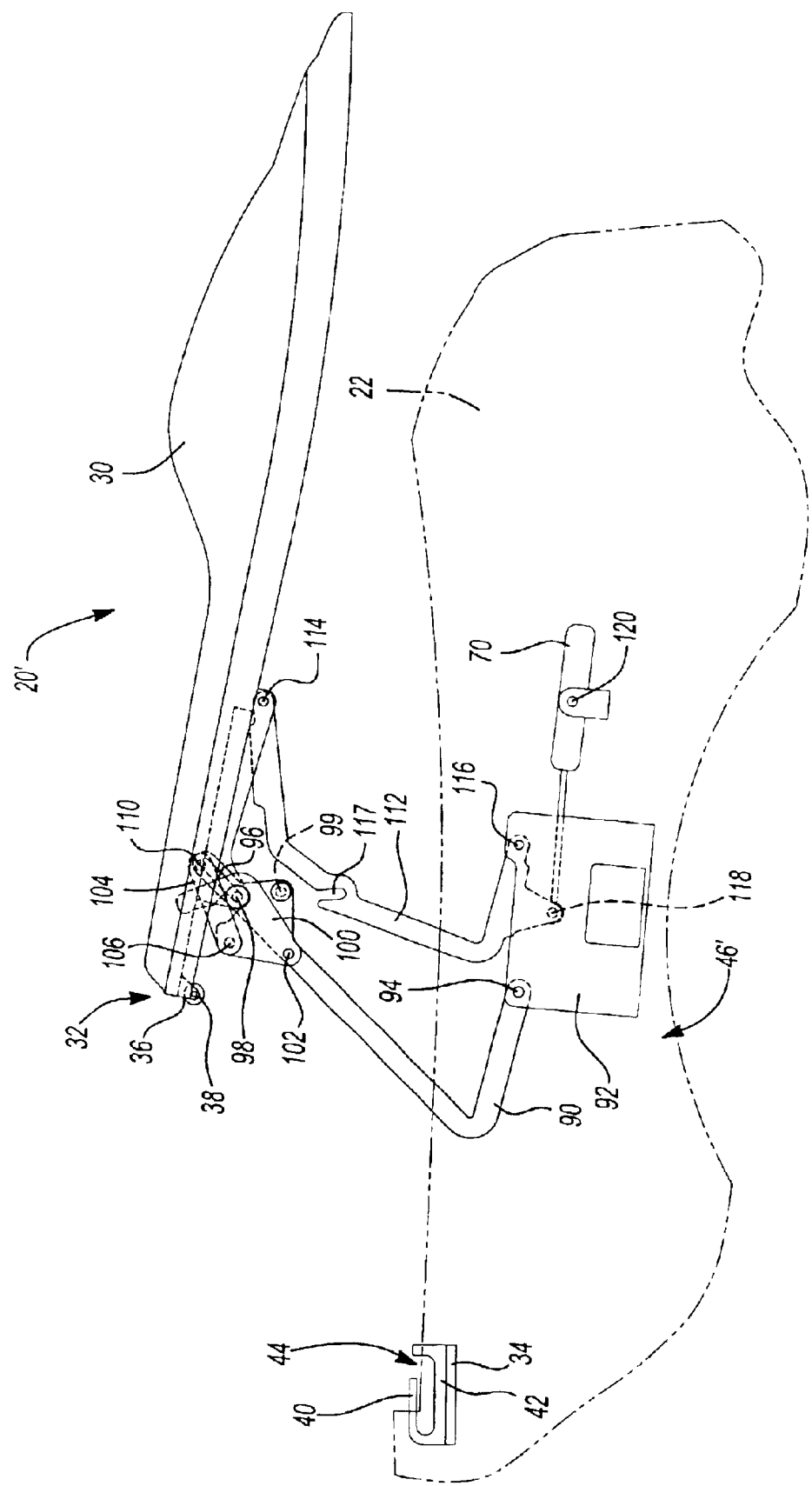
FIG. 8 is a fragmented elevation view of the vehicle of FIG. 6 with the tonneau panel in a different intermediate position.
Figure 9:
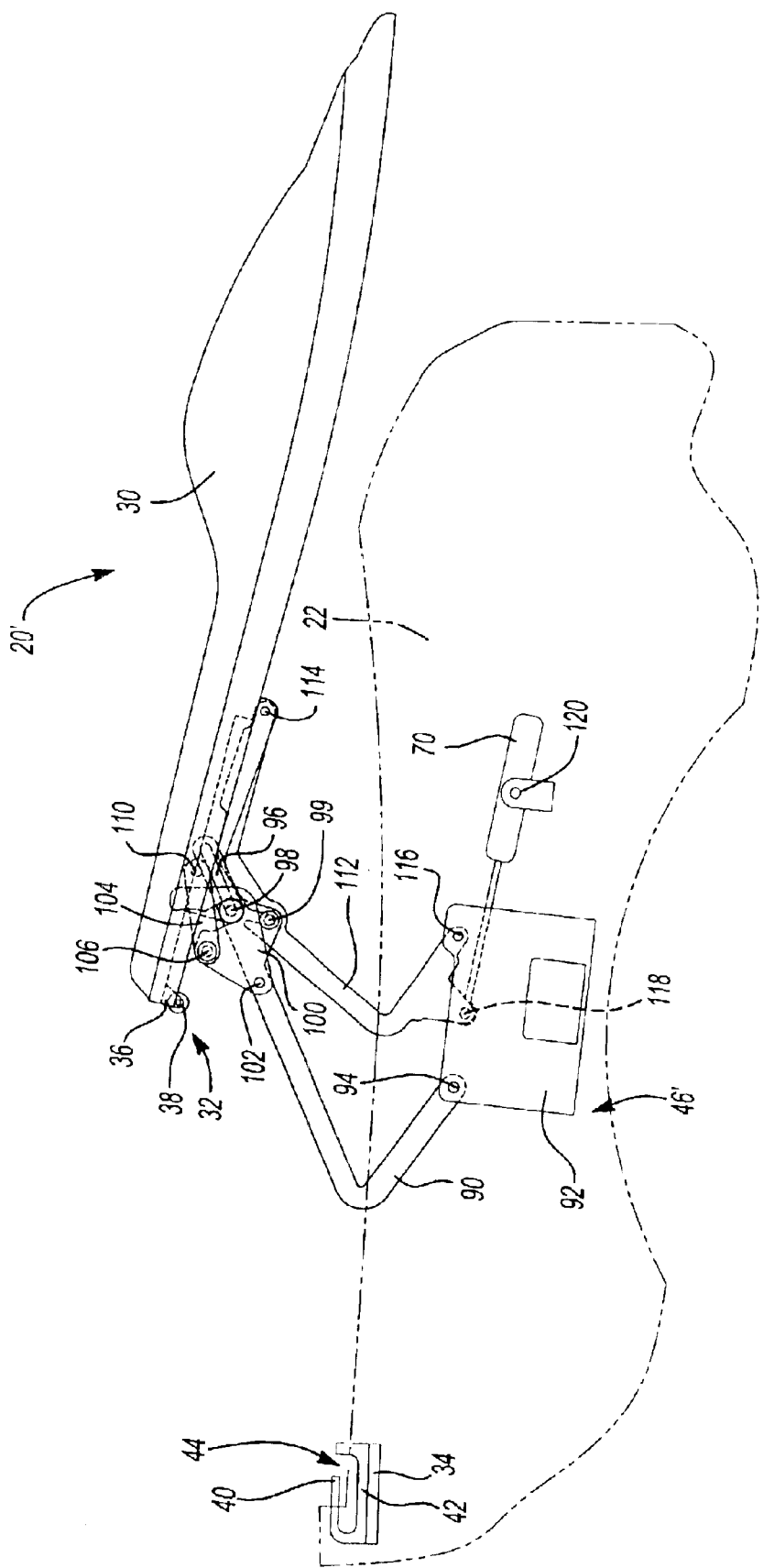
FIG. 9 is a fragmented elevation view of the vehicle of FIG. 6 with the tonneau panel in a fully open position to allow retraction and extension of the convertible roof.

In use, tonneau panel mechanism 20' is operable to cause tonneau panel 30 to move from its closed position, as shown in FIG. 6, through intermediate positions, such as those shown in FIGS. 7 and 8, to its open position, as shown in FIG. 9. When tonneau panel mechanism 20' causes tonneau panel 30 to move from the closed position to the open position, tonneau panel 30 exhibits two distinct stages of motion. In a first stage of motion, first, second and third links 90, 100 and 104 pivot and move relative to one another which causes the rear edge of tonneau panel 30 to move vertically upward away from the vehicle body and projection 32 to move rearwardly along track 34 which moves tonneau panel 30 into a forwardly inclined position. When pin 98 engages completely with channel 108 on second link 100, first, second and third links 90, 100 and 104 lock together and tonneau panel 30 engages in a second stage of motion wherein linkage assembly 46' operates as a four-bar linkage and tonneau panel 30 moves to a rearwardly inclined position.

To move tonneau panel 30 from its closed position to its open position, hydraulic cylinder 70 is operated to cause hydraulic cylinder 70 to elongate. Elongation of hydraulic cylinder 70 causes fourth link 112 to rotate clockwise about pivot 116. Rotation of fourth link 112 about pivot 116 pushes upwardly on tonneau panel 30 and causes the rear edge of tonneau panel 30 to move vertically upwardly while also causing tonneau panel 30 to rotate counterclockwise relative to fourth link 112 about pivot 114. Continued elongation of hydraulic cylinder 70 causes projection 32 on tonneau panel 30 to travel rearwardly along track 34, second link 100 to rotate counterclockwise relative to first link 90 about pivot 102, third link 104 to rotate clockwise relative to tonneau panel 30 about pivot 110, pin 98 to travel along slot 96 toward an intermediate portion of first link 90, and first link 90 to rotate clockwise about pivot 94. This movement causes the front portion of tonneau panel 30 to tilt forwardly and to not substantially raise above the horizontal plane. By keeping the front portion of tonneau panel 30 from raising substantially above the horizontal plane during the first stage of motion, the front portion of tonneau panel 30 can be positioned (when closed) under a rear portion of convertible roof system 26 and moved between the open and closed positions while convertible roof system 26 remains stationary in the raised position.

Continued elongation of hydraulic cylinder 70 eventually causes second link 100 to rotate relative to first link 90 a sufficient amount to cause pin 98 to fully engage channel 108 which locks first, second and third links 90, 100 and 104 together, as shown in FIG. 7. The lengths and dimensions of linkage assembly 46' are coordinated so that when pin 98 is fully engaged with channel 108 and first, second and third links 90, 100 and 104 are locked together, projection 32 is in a rearward portion of track 34 adjacent opening 44. At this time, continued elongation of hydraulic cylinder 70 causes tonneau panel 30 to switch from its first stage of motion to its second stage of motion.

In the second stage of motion, hydraulic cylinder 70 is further elongated which continues to cause first and fourth links 90 and 112 to rotate clockwise about respective pivots 94 and 116 while tonneau panel 30 rotates counterclockwise relative to first and fourth links 90 and 112 in the respective slot 96 and about pivot 114. Projection 32 also disengages from track 34 and tonneau panel 30 moves from a forwardly inclined position to a rearwardly inclined position, as shown in FIG. 8. As hydraulic cylinder 70 continues to elongate and tonneau panel 30 continues to move to its open position pin 99 on first link 90 engages with channel 117 on fourth link 112. When hydraulic cylinder 70 has elongated a sufficient distance, tonneau panel 30 reaches its fully open position and pin 99 on first link 90 is fully engaged with channel 117 on fourth link 112. Engagement of pin 99 with channel 117 stabilizes tonneau panel 30 when in its open position. Once in its open position, convertible roof system 26 can be operated to extend or retract the convertible roof into and out of stowage compartment 28. When it is desired to move tonneau panel 30 from its open position to its closed position, hydraulic cylinder 70 is operated to decrease its length and tonneau panel mechanism 20' is operated in reverse fashion.

Thus, tonneau panel mechanism 20' executes a two-stage motion while moving between its open and closed positions. When moving from its closed position to its open position, the first stage of motion is characterized by the various links of linkage assembly 46' moving relative to one another and tonneau panel 30 moving to a forwardly inclined position. When tonneau panel 30 has been moved a sufficient amount, first, second and third links 90, 100 and 104 are locked and become fixed relative to one another and projection 32 is adjacent opening 44 so that it can disengage from track 34 which switches the continued motion of tonneau panel 30 to the second stage of motion. The second stage of motion is characterized by simple four-bar movement wherein tonneau panel 30 moves to a rearwardly inclined position as first and fourth links 90 and 112 pivot about bracket 92.

Both tonneau panel mechanism 20 and 20' can be used on a vehicle 22 having a convertible roof system 26 that is a soft-top convertible roof system 26', such as that shown in FIGS. 10A–C or, alternatively, a hardtop convertible roof system 26", such as that shown in FIGS. 11A–C which will be further described hereinafter. For brevity, only tonneau panel mechanism 20 will be shown in FIGS. 10A–C and 11A–C. It should be understood, however, that both tonneau panel mechanisms 20, 20' can be used with both soft-top convertible roof systems and hardtop convertible roof systems.

Referring now to FIGS. 10A–C, tonneau panel mechanism 20 is shown on a vehicle 22 having a soft-top convertible roof system 26'. Soft-top convertible roof system 26' includes a linkage assembly or top stack mechanism 128 covered by a pliable fabric top covering 130. More specifically, top stack mechanism 128 includes a number one roof bow 132, a number two roof bow 134, a number three roof bow 136, a number four roof bow 138, and a number five or rearmost roof bow 140. Top stack mechanism 128 also includes a front roof rail 142, a center roof rail 144, and a rear roof rail 146 (shown in FIG. 10C).

As can be seen in FIG. 10C, front roof rail 142 is pivotally coupled to center roof rail 144 and is controlled by a linkage assembly. Center roof rail 144 is pivotally coupled to rear roof rail 146 and is controlled by a different linkage assembly. Soft-top convertible roof system 26' is operable to move between a raised or extended position covering passenger compartment 24, as shown in FIG. 10A, through intermediate positions, such as that shown in FIG. 10B, to a fully retracted or stowed position within stowage compartment 28, as shown in FIG. 10C.

In operation, when it is desired to move soft-top convertible roof system 26' from the raised position to the stowed position, number five roof bow 140 is rotated upwardly and forwardly, as shown in FIG. 10B, an amount sufficient to allow tonneau panel 30 of tonneau panel mechanism 20 to move from its closed to its open position. Once number five roof bow 140 has moved a sufficient distance, tonneau panel mechanism 20 is operated to cause tonneau panel 30 to move from its closed to its open position to allow access to stowage compartment 28. Soft-top convertible roof system 26' is then retracted into stowage compartment 28, as shown in FIG. 10C. As can be seen, roof rails 142, 144 and 146 rotate relative to one another and are stacked on top of one another when in the stowed position. Tonneau panel mechanism 20 is then operated to cause tonneau panel 30 to move to its closed position thereby causing tonneau panel 30 to cover at least a portion of soft-top convertible roof system 26'. While soft-top convertible roof system 26' is shown as being a manually operated soft-top convertible roof system, it should be appreciated that movement of soft-top convertible roof system 26' between its extended and stowed positions can be automated through the use of powered actuators such as hydraulic cylinders, electric motors, pneumatic cylinders, or any suitable power source for driving top stack mechanism 128. Additionally, it should be appreciated that because the front portion of tonneau panel 30 does not substantially raise above the horizontal plane during the first stage of motion, number five roof bow 140, depending on the specific configuration, may not need to be raised prior to moving tonneau panel 30 between the closed and open positions.

Referring to FIGS. 11A–C, tonneau panel mechanism 20 is shown being used with a hardtop convertible roof system 26". Hardtop convertible roof system 26" is the same as that disclosed in U.S. Pat. No. 6,695,386, filed on Sep. 18, 2002, entitled "Vehicle Retractable Hardtop Roof" by Willard and assigned to the assignee of this Application, the disclosure of which is incorporated by reference herein.

Hardtop convertible roof system 26" is movable between an extended or raised position, shown in FIG. 11A, wherein the passenger compartment 24 is covered by the hardtop convertible roof system 26" and a retracted or stowed position, as shown in FIG. 11C, wherein the hardtop convertible roof system 26" is stored in stowage compartment 28 and at least partially covered by tonneau panel 30.

Hardtop convertible roof system 26" includes a convertible roof 158. Convertible roof 158 includes a first roof section 160 with an exterior surface 161, a second roof section 162, a third roof section 164, and a retraction mechanism 166. Each of the first, second and third roof sections 160, 162 and 164 are substantially rigid members interconnected by retraction mechanism 166. Retraction mechanism 166 is mounted in a cavity of stowage compartment 28. Retraction mechanism 166 includes a pair of actuation assemblies 168 mounted near each outboard edge of vehicle 22. Each of the actuation assemblies 168 are substantially identical mirror images to one another and only the driver's side actuation assembly is depicted.

Actuation assembly 168 includes a linkage assembly 170 coupled to an actuator 172. Actuator 172 is depicted as a hydraulic cylinder coupled to linkage assembly 170. It should be appreciated that actuator 172 may alternately be constructed as an electric motor, a pneumatic cylinder or any suitable power source for driving linkage assembly 170. Preferably, actuator 172 is the same type of actuator as powered actuator 70.

Tonneau panel mechanism 20 is controlled to coordinate the movement of tonneau panel mechanism 20 with that of convertible roof 158 such that stowage compartment 28 is accessible when moving convertible roof 158 between the raised and stowed positions. As depicted in FIG. 11B, tonneau panel mechanism 20 is moved to its open position and retraction mechanism 166 causes first roof section 160 to pivot relative to second roof section 162 in a clamshell manner such that an inner surface of first roof section 160 approaches an inner surface of second roof section 162 while third roof section 164 begins to enter stowage compartment 28.

With reference to FIG. 11C, convertible roof 158 is shown in the stowed position. In the stowed position, first roof section 160 and second roof section 162 are each positioned in a substantially horizontal manner within stowage compartment 28. Once in the stowed position, tonneau panel mechanism 20 is operated to cause tonneau panel 30 to move from its open position to its closed position and covers at least a portion of convertible roof 158 with tonneau panel 30 and at least a portion of exterior surface 161 is visible.

Thus, tonneau panel mechanisms 20 and 20' provide a tonneau panel 30 that covers and conceals at least a portion of stowage compartment 28. Tonneau panel mechanisms 20 and 20' can be open to allow access to stowage compartment 28 so that a convertible roof system 26 can move between extended and retracted positions. Additionally, tonneau panel mechanisms 20 and 20' allow tonneau panel 30 to move between open and closed positions while convertible roof system 26 remains stationary in the raised position even if a portion of tonneau panel 30 resides below a rear portion of convertible roof system 26 when tonneau panel 30 is in the closed position.

It should be appreciated that tonneau panel mechanisms 20 and 20' can be used with other convertible roof systems beyond the specific soft-top and hardtop convertible roof systems disclosed. For example, tonneau panel mechanisms 20 and 20' can be used with a vehicle having an out folding convertible roof such as that disclosed in U.S. Pat. No. 4,828,317 entitled "Convertible Top Frame with Quarter Windows" by Muscat, and with a vehicle having a soft-top convertible roof system such as that disclosed in U.S. Pat. No. 6,288,511 entitled "Automotive Convertible Top System" by Porter et al. and assigned to the assignee of this Application, the disclosures of which are incorporated by reference herein.

It should further be appreciated that a lock or latching mechanism (not shown) can be employed to further secure the front portion of tonneau panel 30 in the closed position. Additionally, track 34 can be curved, slanted or the like to provide a desired path of motion for the front portion of tonneau panel 30 without departing from the scope of the present invention. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A storage compartment covering-panel mechanism comprising:
   a panel operable between open and closed positions;
   a linkage assembly including at least one link, said linkage assembly being operable to cause said panel to move between said open and closed positions;
   a pivot of said panel being forward of a rearmost section of said panel;
   a stationary track; and
   a projection on said panel configured to engage with and move along said track, said projection engaging with said track when said panel is in said closed position and said projection disengaging from said track when said panel is in said open position.

2. The mechanism of claim 1, wherein said projection disengages from said track prior to said panel reaching a fully open position when said panel moves from said closed to said open position.

3. The mechanism of claim 1, wherein said linkage includes at least a four bar linkage.

4. The mechanism of claim 1, wherein said projection is a roller configured to roll along said track.

5. The mechanism of claim 1, wherein said projection is locked in engagement with said track when said panel is in said closed position and said projection is locked in engagement with said track during a portion of movement of said panel between said open and closed positions.

6. The mechanism of claim 1, wherein said projection is located on a forward portion of said panel and said track has an elongated slot within which said projection is received, and the panel is a substantially rigid tonneau panel.

7. An automotive vehicle system comprising:
   a convertible roof system including a convertible roof operable between extended and retracted positions;
   a storage compartment having a rearmost point defining a substantially vertical plane;
   a panel operable between open and closed positions, said panel operably covering said storage compartment in its closed position, said panel having a front portion that defines a substantially horizontal plane when said panel is in said closed position; and
   a linkage assembly including at least one link and at least one fixed pivot axis, said linkage assembly being operable to move said panel between said open and closed positions and said linkage assembly being coupled to a central or front portion of said panel;
   wherein said front portion of said panel does not substantially raise above said horizontal plane during initial movement of said panel from said closed to said open position,
   wherein a rear edge of said panel is rearward of said rearmost and substantially vertical plane of said storage compartment when open, wherein said panel remains above all fixed pivot axes of said linkage assembly in all operative positions, and wherein said panel is substantially rigid and said convertible roof can remain in said extended position while said panel moves between said open and closed positions.

8. The system of claim 7, wherein said convertible roof system includes a hardtop convertible roof.

9. The system of claim 7, wherein said convertible roof system includes a soft-top convertible roof.

10. The system of claim 7, wherein said panel is a tonneau panel which automatically opens to allow said convertible roof to move between said extended and retracted positions.

11. The system of claim 7, wherein said panel covers a portion of said convertible roof when said convertible roof is in said retracted position and said panel is in said closed position.

12. The system of claim 7, wherein at least a portion of an exterior surface of said convertible roof is visible when said convertible roof is in said retracted position and said panel is in said closed position.

13. The system of claim 7, wherein a portion of said panel rides along a stationary track during a portion of movement between said open and closed positions.

14. A tonneau panel mechanism comprising:

a tonneau panel having opposite first and second sides and operable between open and closed positions; and a linkage assembly on each of said first and second sides of said tonneau panel operable to move said tonneau panel between said open and closed positions, each linkage assembly including a single link that rotates about a single pivot and a powered actuator operable to drive said single link about said pivot;

wherein said tonneau panel rotates about said single pivots through at least a portion of movement of said tonneau panel between said open and closed positions; and wherein each single link includes a flat spot that engages with said tonneau panel during said rotation of said tonneau panel about said single pivots.

15. The tonneau panel mechanism of claim 14, wherein said tonneau panel has first and second stages of motion as said tonneau panel moves between said open and closed positions, said first stage of motion including both pivotal and non-pivotal sliding motion and said second stage of motion including said rotation about said single pivots.

16. The tonneau panel mechanism of claim 15, wherein said tonneau panel moves in said first stage of motion then moves in said second stage of motion as said tonneau panel moves from said closed position to said open position.

17. The tonneau panel mechanism of claim 14, wherein said tonneau panel rotates about said single pivots through a majority portion of movement of said tonneau panel between said open and closed positions.

18. The tonneau panel mechanism of claim 14, further comprising a stationary track and wherein said tonneau panel engages and disengages from said track during movement of said tonneau panel between said open and closed positions.

19. The tonneau panel mechanism of claim 14, wherein said tonneau panel moves between a forwardly inclined position and a rearwardly inclined position during when rotating about said single pivots.

20. A tonneau panel mechanism comprising:

a tonneau panel operable between first and second positions, said tonneau panel having a stop; and a linkage assembly including at least one link having an abutting member, said linkage assembly being operable to cause said tonneau panel to move between said first and second positions;

wherein said abutting member on said at least one link engages with said stop on said tonneau panel in at least one position of said tonneau panel between said first and second positions and said stop and said abutting member both move during movement of said tonneau panel between said first and second positions.

21. The tonneau panel mechanism of claim 20, wherein said abutting member is a substantially flat spot on said at least one link.

22. The tonneau panel mechanism of claim 21, wherein said at least one link has first and second ends, said first end is pivotally attached to said tonneau panel, said second end is pivotally attached to a fixed location and said flat spot is located on said first end.

23. The tonneau panel mechanism of claim 20, wherein engagement of said abutting member with said stop alters motion of said to tonneau panel as said tonneau panel moves between said first and second positions.

24. The tonneau panel mechanism of claim 23, wherein motion of said tonneau panel is changed from a sliding and pivoting motion to a pivoting motion when said abutting member engages with said stop.

25. The tonneau panel mechanism of claim 20, wherein said stop is adjustable.

26. The tonneau panel mechanism of claim 20, wherein said at least one link is a goose neck link.

27. A panel mechanism comprising:

a panel operable between first and second positions; and a linkage assembly including at least a four bar linkage, said linkage assembly being operable to cause said panel to move between said first and second positions;

wherein at least two links of said linkage assembly move relative to one another during a first portion of movement of said panel between said first and second positions and said at least two links are locked together during a second portion of movement of said panel between said first and second positions altering motion of said panel and at least one of said two links is directly connected to said panel.

28. The panel mechanism of claim 27, wherein one link of said at least two links is pivotally attached to a fixed location.

29. A panel mechanism comprising:

a panel operable between first and second positions; and a linkage assembly including at least a four bar linkage, said linkage assembly being operable to cause said panel to move between said first and second positions;

wherein at least two links of said linkage assembly move relative to one another during a first portion of movement of said panel between said first and second positions and said at least two links are locked together during a second portion of movement of said panel between said first and second positions altering motion of said panel, and further comprising a pin on said panel, wherein a first link of said at least two links has a slot and said pin travels along said slot in said first link during said first portion of movement of said panel between said first and second positions.

30. The panel mechanism of claim 29, wherein a second link of said at least two links locks said pin in said slot during said second portion of movement of said panel between said first and second positions, thereby locking said at least two links together.

31. The panel mechanism of claim 30, wherein said second link is pivotally attached to said first link.

32. The panel mechanism of claim 31, wherein said at least two links is at least three links, and a third link of said at least three links is pivotally attached to said panel and pivotally attached to said second link.

33. A panel mechanism comprising:
a panel operable between first and second positions; and
a linkage assembly including at least a four bar linkage, said linkage assembly being operable to cause said panel to move between said first and second positions;
wherein at least two links of said linkage assembly move relative to one another during a first portion of movement of said panel between said first and second positions and said at least two links are locked together during a second portion of movement of said panel between said first and second positions altering motion of said panel,
wherein a first link of said at least four bar linkage is pivotally attached to a fixed location and directly pivotally attached to said panel, one of said at least two links has a pin, and said first link engages with said pin when said panel is in said second position stabilizing said panel in said second position.

34. A panel mechanism comprising:
a panel operable between open and closed positions; and
a linkage assembly including at least two links, said linkage assembly being operable to cause said panel to move between said open and closed positions;
wherein said at least two links move relative to one another during substantially an entire range of movement of said panel between said open and closed positions and lock together when said panel is in said open position providing stability for said panel.

35. The panel mechanism of claim 34, wherein each of said at least two links are pivotally coupled to said panel which is a convertible roof-covering and substantially rigid tonneau panel.

36. The panel mechanism of claim 34, wherein one of said at least two links has a projection member and the other of said at least two links has an open-ended slot configured to receive said projection and said projection resides in said slot when said panel is in said open position locking said at least two links together.

37. A method of operating a convertible roof system in conjunction with a tonneau panel mechanism on an automotive vehicle, the method comprising:
(a) moving a tonneau panel from a closed position to an intermediate position with a pair of linkage assemblies that couple opposite sides of said tonneau panel to the vehicle including sliding a portion of said tonneau panel along a stationary track as said tonneau panel moves from said closed position to said intermediate position, wherein each of said linkage assemblies includes a single link that rotates about a single pivot, and a powered actuator coupled to said single link and being operable to drive said single link about said single pivot;
(b) moving said tonneau panel from said intermediate position to an open position by rotating said tonneau panel about said single pivots;
(c) moving a convertible roof from an extended position to a retracted position; and
(d) moving said tonneau panel from said open position to said closed position.

38. The method of claim 37, wherein step (b) includes disengaging said portion of said tonneau panel from said stationary track.

39. The method of claim 37, wherein a forward portion of said tonneau panel defines a substantially horizontal plane when said tonneau panel is in said closed position and step (a) includes maintaining said front portion of said tonneau panel from raising substantially above said horizontal plane as said tonneau panel is moved from said closed position to said intermediate position.

40. The method of claim 37, wherein step (a) includes moving a front portion of said tonneau panel out from under a portion of said convertible roof while said convertible roof is stationary and in said extended position.

41. The method of claim 37, wherein each of said single links includes an abutting member, said tonneau panel has a pair of stop members and step (b) includes engaging said abutting members on said single links with said stop members on said tonneau panel while said tonneau panel moves from said intermediate position to said open position.

* * * * *

UNITED STATES PATENT AND TRADEMARK OFFICE
CERTIFICATE OF CORRECTION

PATENT NO. : 6,866,327 B2  
DATED : March 15, 2005  
INVENTOR(S) : Michael Willard It is certified that error appears in the above-identified patent and that said Letters Patent is hereby corrected as shown below:

<u>Column 4,</u>  
Line 45, "balance-and" should read -- balance and --.

Signed and Sealed this

Eighteenth Day of April, 2006

JON W. DUDAS  
*Director of the United States Patent and Trademark Office*